United States Patent
Frevert

(10) Patent No.: US 8,692,420 B2
(45) Date of Patent: Apr. 8, 2014

(54) SAFETY DEVICE FOR MULTICHANNEL CONTROLLING OF A SAFETY-RELATED UNIT

(75) Inventor: Henning Frevert, Lemgo (DE)

(73) Assignee: Phoenix Contact GmbH & Co. KG (DE)

( * ) Notice: Subject to any disclaimer, the term of this patent is extended or adjusted under 35 U.S.C. 154(b) by 1010 days.

(21) Appl. No.: 12/668,086

(22) PCT Filed: Jul. 9, 2008

(86) PCT No.: PCT/EP2008/005600
§ 371 (c)(1),
(2), (4) Date: May 3, 2010

(87) PCT Pub. No.: WO2009/007104
PCT Pub. Date: Jan. 15, 2009

(65) Prior Publication Data
US 2010/0207720 A1 Aug. 19, 2010

(30) Foreign Application Priority Data

Jul. 12, 2007 (DE) .......................... 10 2007 032 827

(51) Int. Cl.
*H01H 47/00* (2006.01)
*H02H 3/00* (2006.01)

(52) U.S. Cl.
CPC ........... *H01H 47/002* (2013.01); *H01H 47/004* (2013.01); *H02H 3/00* (2013.01)
USPC ....................................................... 307/326

(58) Field of Classification Search
CPC ...... H01H 47/002; H01H 47/004; H02H 3/00
USPC ....................................................... 307/326
See application file for complete search history.

(56) References Cited

U.S. PATENT DOCUMENTS

| 4,027,251 | A | * | 5/1977 | Fathauer et al. | ........... 455/165.1 |
| 6,778,080 | B2 | * | 8/2004 | Veil et al. | ...................... 340/506 |

(Continued)

FOREIGN PATENT DOCUMENTS

| DE | 10 2004 020 995 A1 | 11/2005 |
| WO | 01/75532 A1 | 10/2001 |

(Continued)

OTHER PUBLICATIONS

"Chinese Office Action for Chinese Application No. 200880024397.0", Jun. 24, 2011, Publisher: Chinese Patent Office, Published in: CN.

(Continued)

*Primary Examiner* — Adi Amrany
(74) *Attorney, Agent, or Firm* — Kaplan Breyer Schwarz & Ottesen, LLP

(57) ABSTRACT

The invention relates to a safety device, comprising a first, microprocessor-controlled control unit and a second control unit, for multichannel controlling of a safety-related unit. The first microprocessor-controlled control unit has a signal generation unit for generating a first monitoring signal that indicates the current operating state of the first control unit. In addition, a switching unit drivable by the first and second control unit that can turn on the safety-related unit or run it into a secured state is provided. The second control unit has a monoflop that, in response to the monitoring signal, drives the switching unit in such a manner that the safety-related unit can be driven into a safe state in case of faulty operation of the first control unit. A device is associated with the first control unit for generating an enable signal for the second control unit.

11 Claims, 6 Drawing Sheets

(56) References Cited

U.S. PATENT DOCUMENTS 8,363,371 B2 * 1/2013 Korrek ........................ 361/93.1
2002/0180278 A1 * 12/2002 Veil et al. .................... 307/326
2008/0067876 A1 * 3/2008 Nitsche et al. ............... 307/326

FOREIGN PATENT DOCUMENTS

WO      2007/014725  A1    2/2007
WO   WO 2007/014725   *    2/2007   ............ H01H 47/00

OTHER PUBLICATIONS

International Search Report and Written Opinion, dated Oct. 21, 2008, EPO.

Yolaine Cussac, "International Preliminary Report on Patentabilty for International Application No. PCT/EP2008/005600", Feb. 18, 2010, Publisher: PCT.

* cited by examiner

SAFETY DEVICE FOR MULTICHANNEL CONTROLLING OF A SAFETY-RELATED UNIT

FIELD OF THE INVENTION

The invention relates to a safety device for multichannel controlling of a safety-related unit.

BACKGROUND OF THE INVENTION

German Patent Application No. 10 2006 001805 discloses a multichannel safety device with which a safety-related unit such as an industrial robot as a component of an automation system, or the entire system, can be run into a secured state. A safe state exists, for example, when the power supply of the industrial robot or the automation system is shut off or a safety door that blocks access to the industrial robot is locked. The safety device has a control unit controlled by a microprocessor and an additional, purely hardware-based control unit. The hardware-based unit is distinguished in that it is not controlled by a microprocessor, but uses a circuitry implementation, preferably a monoflop, as a switching or control unit. A modulated input signal is fed to both control units. The modulation signal indicates whether the microprocessor-controlled control unit is operating without errors. In particular, the modulation signal indicates whether the microprocessor is correctly executing safety-relevant programs or program components. A safety-relevant program can perform a diagnostic procedure, check the power supply of the control unit, query system parameters such as the contact positions of a relay driven by the control units, query the operating state of the hardware-based control unit cyclically, and so on. If the microprocessor is not executing safety-relevant programs or program components, which can be subprograms, as specified, the modulation signal remains in a static state that corresponds to a persistent high or low level. For example, the control unit outputs a high level as the modulation signal if a safety-relevant program is not launched. A low signal can be generated by the control unit as the modulation signal if a safety-relevant program is not terminated as specified. During proper operation, the microprocessor-control unit generates a dynamic modulation signal as shown, for example, in FIG. 2. Only if a dynamic signal is present at the hardware-based control unit is a switching device triggered in such a manner that a safety-related unit such as an industrial robot, an automation system or the like can be properly operated. If a static signal is present at the hardware-based control unit, the switching device is deactivated, so that the industrial robot can be run into a secured state. Thanks to the multichannel safety device, a safety-related unit can be run into a safe state even if the microprocessor-controlled control unit operates in a faulty manner. If a monoflop is used in the hardware-based control unit, the monoflop trigger time must not be longer than the specified safety shutdown time. The microprocessor-controlled control unit can recognize faults in the hardware-based control unit, because the transfer function of the hardware-based control unit, e.g., the transfer function of the monoflop, is known to it, and in addition, the input and output signal of the hardware-based control unit are fed to it. From the transfer function and the input signal of the hardware-based control unit, the microprocessor-based control unit can calculate the expected output signal of the hardware-based control unit and then compare this to the fed-back output signal. If the two signals do not match, the microprocessor-based control unit drives the switching unit in such a manner that the safety-related unit is run into the safe state.

Automation systems generally comprise fieldbus systems, to which actuators and sensors, as well as higher-level or lower-level control and monitoring devices can be connected. An important requirement of such automation systems is that, particularly when a fault occurs, a faulty safety-related component, e.g., an actuator, or even the entire automation system, can be run into a secured state. To allow a safe shutdown of the automation system or a faulty actuator, it must be assured that a defined input signal that is intended to run the automation system into the safe state is always interpreted as a shutdown signal.

For systems and equipment that belong to a given safety category, for example, multichannel monitoring systems are used, which contain subsystems operating independently of one another, each of which can run the system or individual devices into a secured state. The multichannel or redundantly constructed monitoring systems are further configured in such a manner that the subsystems can monitor the functionality of the respective other subsystem. The mutual monitoring is generally performed by a bidirectional exchange of status data. In the known multichannel monitoring systems, each subsystem has its own microprocessor, with each subsystem able to run the system into a safe state.

SUMMARY OF THE INVENTION

The present invention is based on the problem of further developing the safety device described above in such a manner that the provisions of Cat. 4 of DIN EN 954 are satisfied.

Cat. 4 of DIN EN 954 demands, among other things, that faults in lines to and from a sensor, e.g., an emergency-off button, be recognized. Such faults can be short circuits in the lines leading to or from the operating voltage or to ground, or cross-connections between conductors. Cat. 4 of DIN EN 954 further demands that a fault in the microprocessor-controlled control unit during the change of state, particularly when switching on the safety-related unit, be recognized by the other control unit.

A core idea of the invention is to provide measures with which the microprocessor-controlled control unit and/or the hardware-based control unit can recognize short circuits and cross-connections in the lines to and from a sensor and, in response to a recognized short circuit or cross-connection, run the monitored safety-related unit into the secured state. An additional or optional measure is to deactivate the hardware-based control unit if, when the safety-related unit starts up, the microprocessor-controlled control unit is no longer capable of running the safety-related unit into the safe state. In this case, the hardware-based control unit keeps the safety-related unit in the safe state; i.e., the safety-related unit cannot be operated. It can be pointed out at this point that a microprocessor-controlled control unit is to be understood to be a device that decides by means of a program-controlled microprocessor whether the safety-related unit should be put into operation, e.g., start up, or run into a safe state. A hardware-based control unit is to be understood to be a device that contains, in place of a microprocessor, an electronic circuit, e.g., a monoflop, that generates a predetermined output signal when an input signal is present.

The above-specified technical problem is addressed by a safety device for multichannel controlling of a safety-related unit, which is provided.

It can be pointed out at this point that a safety-related unit can be an actuator of an automation system, such as an industrial robot, an executable safety engineering application and/or an automation system itself. For this purpose, a microprocessor-controlled control unit is provided that has a signal generation unit to generate a first monitoring signal. The first monitoring signal indicates the current operating state of the first control unit. The first monitoring signal preferably indicates whether the microprocessor in the first control unit is operating in a specified manner. In addition, a second control unit, as well as a switching unit that can be driven by the first and second control units, is provided. The switching unit can turn on the safety-related unit or run it into a secured state. It can be mentioned at this point that the switching unit preferably turns on the safety-related unit when it is activated by both control units, whereas the safety-related unit can be driven into a secured state when it is deactivated by at least one of the two control units. The second control unit has a hardware-based switching unit that, in response to the monitoring signal, drives the switching unit in such a manner that the safety-related unit can be driven into a safe state in case of faulty operation of the first control unit. In one expedient embodiment, this happens whenever the microprocessor no longer performs the specified functions. In addition, a device for generating an enable signal for the second control unit is assigned to the first control unit. In this manner it is assured that in case there is a demand to turn the safety-related unit on, for example, it is only turned on if the first microprocessor-controlled control unit is operating properly. In case of a fault, no enable signal is applied to the second control unit, so that the safety-related unit remains in the safe state. A fault is present, for example, if the first control unit can no longer turn the safety-related unit off.

In order to be able to recognize a faulty or a fault-free operation of the first control unit, the signal generation unit generates an alternating current signal if the first control unit, in particular the microprocessor, is operating error-free, whereas a direct current signal is generated if the first control unit, preferably the microprocessor is operating erroneously.

In order to be able to construct a second control unit economically, the hardware-based switching unit has a monoflop.

The switching unit advantageously has a first safety relay associated with the first control unit, and a second safety relay associated with the second control unit. It may be noted that the first control unit and the associated first safety relay can be referred to as channel 1, and the second control unit and the associated second relay can be referred to as channel 2 of the multichannel safety device. Each safety relay has positively driven contacts. This means each safety has at least one break contact and at least one make contact that are fixedly coupled to one another. This has the effect that one contact is forcibly opened and the other contact is closed. The enable signal is generated only in case of a fault-free function of the first safety relay. This assures that the second control unit can recognize a safety-critical failure in channel 1, particularly if the make contact of the first safety relay no longer opens in a change of state. A change of state is understood to be a change of the operating mode of the system, for instance if the safety-related unit is to be started up. It may be noted at this point that the second control unit only obtains the enable signal in case a change of state if the first safety relay associated with the first control unit is operating properly. If not, the second control unit does not receive an enable signal, which has the effect that the second control unit does not trigger the second safety relay associated with it, so that the safety-related unit remains in the safe state.

The monoflop has a master reset input for applying the enable signal and a trigger input to which the first monitoring signal is supplied directly or, as will be explained below, indirectly. The monoflop of the second control unit drives the second safety relay associated with it only if the enable signal is present, and a monitoring signal has been generated that indicates the proper operating state of the first control unit, in particular, the proper functioning state of the microprocessor.

In order that the monoflop remain activated even during proper operation, a circuit for keeping the master reset input at the level of the enable signal is associated with the monoflop. The monoflop is automatically reset if no signal, or a static signal, is present at the trigger input, which indicates faulty operation, in particular, of the microprocessor in the first control unit.

In order that the multichannel safety device be able to operate also as a stand-alone device, an input stage, constructed for modulating an input signal from an externally connectable sensor unit with the first monitoring signal generated by the signal generation unit, is associated with the first and second control unit. In this case, the sensor unit is an active sensor that can itself generate an output signal. An active sensor can be a safety door. By contrast, an emergency off switch constitutes a passive sensor.

The first control unit and/or the second control unit can run the safety-related unit into a safe state in response to the modulated input signal, the first modulated input signal being applied to the trigger input of the hardware-based switching unit. In case of faulty operation of the first control unit, the modulated input signal is a static signal that is recognized by the microprocessor of the first control unit as an error signal, whereupon the microprocessor deactivates the first safety relay associated with the first control unit. The monoflop of the second control unit is deactivated by the static input signal, so that the second safety relay associated with the second control unit is or remains deactivated.

In order to be able to recognize short circuits in the incoming and outgoing lines of an externally connectable passive sensor, and short circuits in the outgoing lines of an active sensor, the signal generation unit of the first control unit is constructed to generate a second monitoring signal. The second monitoring signal likewise indicates the current operating state of the first control unit, in particular, the microprocessor. The two monitoring signals differ only in that if there is an alternating current signal, a phase shift exists between the two monitoring signals. The input stage is constructed in this case to modulate a second input signal coming from the first connectable sensor device with the second monitoring signal generated by the signal generation unit. The second modulated input signal is supplied only to the first control unit. In this manner, short circuits to the incoming and outgoing lines can be recognized by the first and/or second control unit, while cross-connections between the incoming and outgoing sensor lines are recognized by both control units, since the input signal output by the sensor in this case is a static signal, which is recognized as a fault by both the microprocessor of the first control unit and by the monoflop of the second control unit. In response to a cross-connection or a short circuit in the outgoing and/or incoming sensor lines, the safety relays associated with the first and second control units are deactivated, whereby the safety-related unit is run into a safe state, for example by turning off the power supply.

For this purpose, the input stage advantageously has a first logic unit for AND-ing the first input signal with the first monitoring signal and a second logic unit for AND-ing the second input signal with the second monitoring signal.

For the case where the sensor unit is a passive sensor, such as an emergency off switch, the signal generation unit supplies a second monitoring signal, the first monitoring signal being conducted via the externally connected passive sensor to the first and second control unit, whereas the second monitoring signal is conducted via the externally connected sensor only to the first control unit, without the necessity of a logic unit.

In order for the first control unit to be able to monitor the operating state of the second control unit, it has a memory in which the transfer function of the hardware-based switching unit is stored. The microprocessor is capable of determining the operating state of the second control unit using the first modulated input signal, the output signal of the second control unit fed back to it, and the stored transfer function. The microprocessor can determine the expected output signal of the second control unit, more precisely, the hardware-based switching unit, from the known input signal and the stored transfer function. If the fed-back output signal and the calculated output signal of the second control unit do not agree, then a fault is present. Depending on the design of the safety device, the first control unit deactivates the associated first safety relay and/or the second safety relay associated with the second control unit, which has the effect that the safety-related unit is run into, or kept in, a safe state.

In certain applications it is reasonable or necessary that the output signal from the second control unit be changed offset by a defined time from the change of the input signal. This can be achieved by providing a device for adjusting the reaction time of the monoflop. In order that the microprocessor can monitor the reaction time that has been set, the first control unit has a memory for storing the reaction time of the monoflop. Since both the input signal and the output signal of the second control unit are supplied to the microprocessor of the first control unit, it can calculate the actual reaction time of the monoflop. If it does not agree with the stored reaction time, the first control unit can assure that the first and/or second safety relay is deactivated. The reaction time can be manually stored in the memory of the first control unit or automatically read out from the adjustment device by the microprocessor of the first control unit. Circuit realizations for an automated readout of the reaction time are known to the person skilled in the art and are not subject matter of the invention.

The above-mentioned technical problem is likewise solved by a safety device for multichannel control of a safety-related unit in which the signal generation unit supplies a second monitoring signal and the input stage is constructed to modulate a second input signal coming from the first externally connectable sensor device with the second monitoring signal generated by the signal generation unit. The second modulated input signal is supplied to the first control unit, and the first monitoring signal is supplied to the first and second control unit for evaluation.

The above-mentioned technical problem is additionally solved by a safety device in which the signal generation unit supplies a second monitoring signal, the first monitoring signal being conducted via an externally connected passive sensor to the first and second control unit, whereas the second monitoring signal is conducted via the externally connected sensor only to the first control unit.

BRIEF DESCRIPTION OF THE DRAWINGS

The invention will be described in detail below with reference to two embodiments, in connection with the appended drawings. Therein.

DETAILED DESCRIPTION

Figure 1:
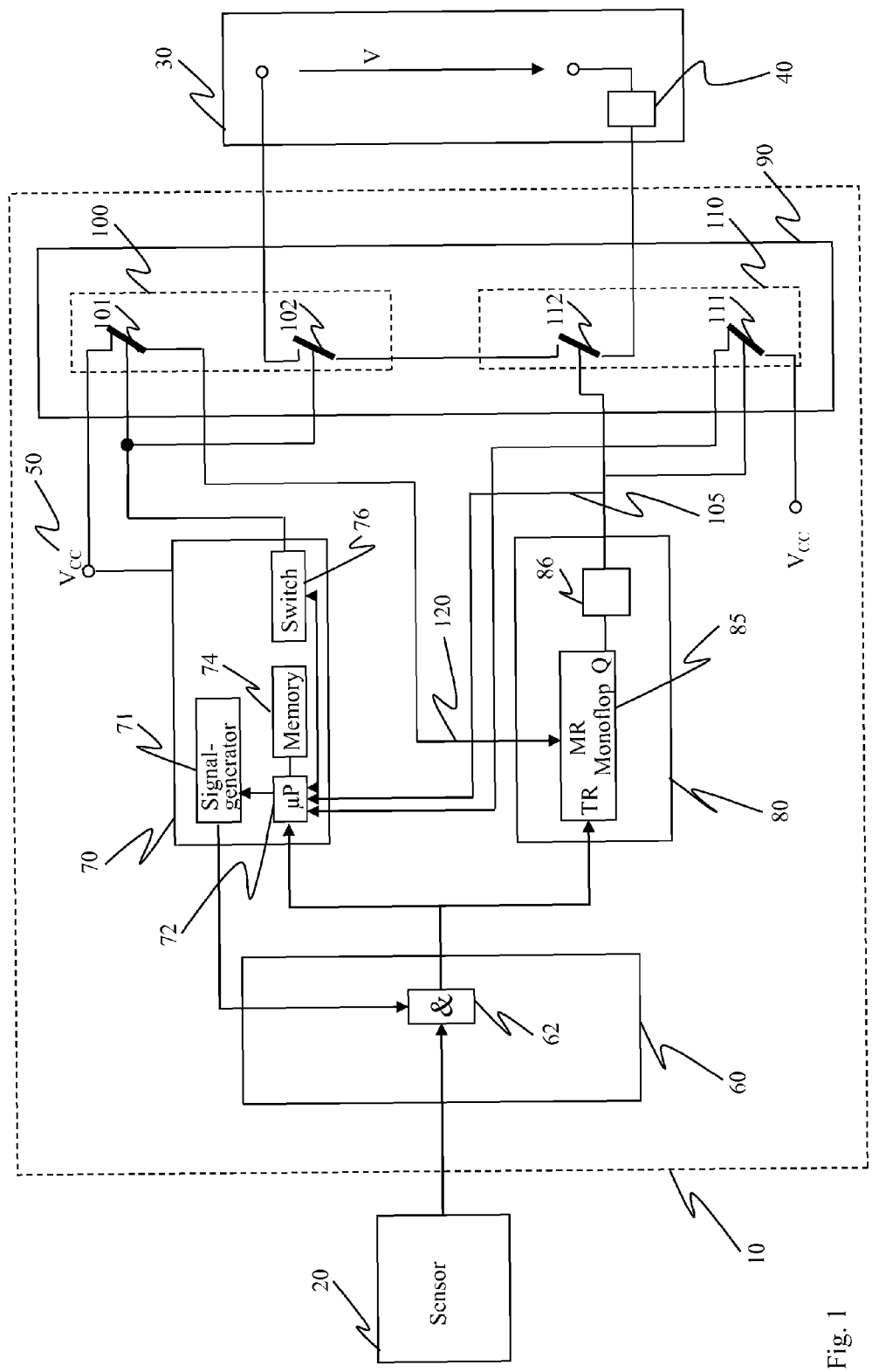
FIG. 1 shows a schematic block circuit diagram of a safety device for multichannel controlling of a safety-related unit, in which an enable signal is generated.

FIG. 1 shows an exemplary multichannel safety device 10 to which an active sensor 20, for example, a safety door, is connected. On the output side, a safety-related unit 30 is connected, which is represented symbolically by an industrial robot 40 and supply voltage V. Of course, several sensors and safety-related units can also be connected to such a safety device.

Figure 2:
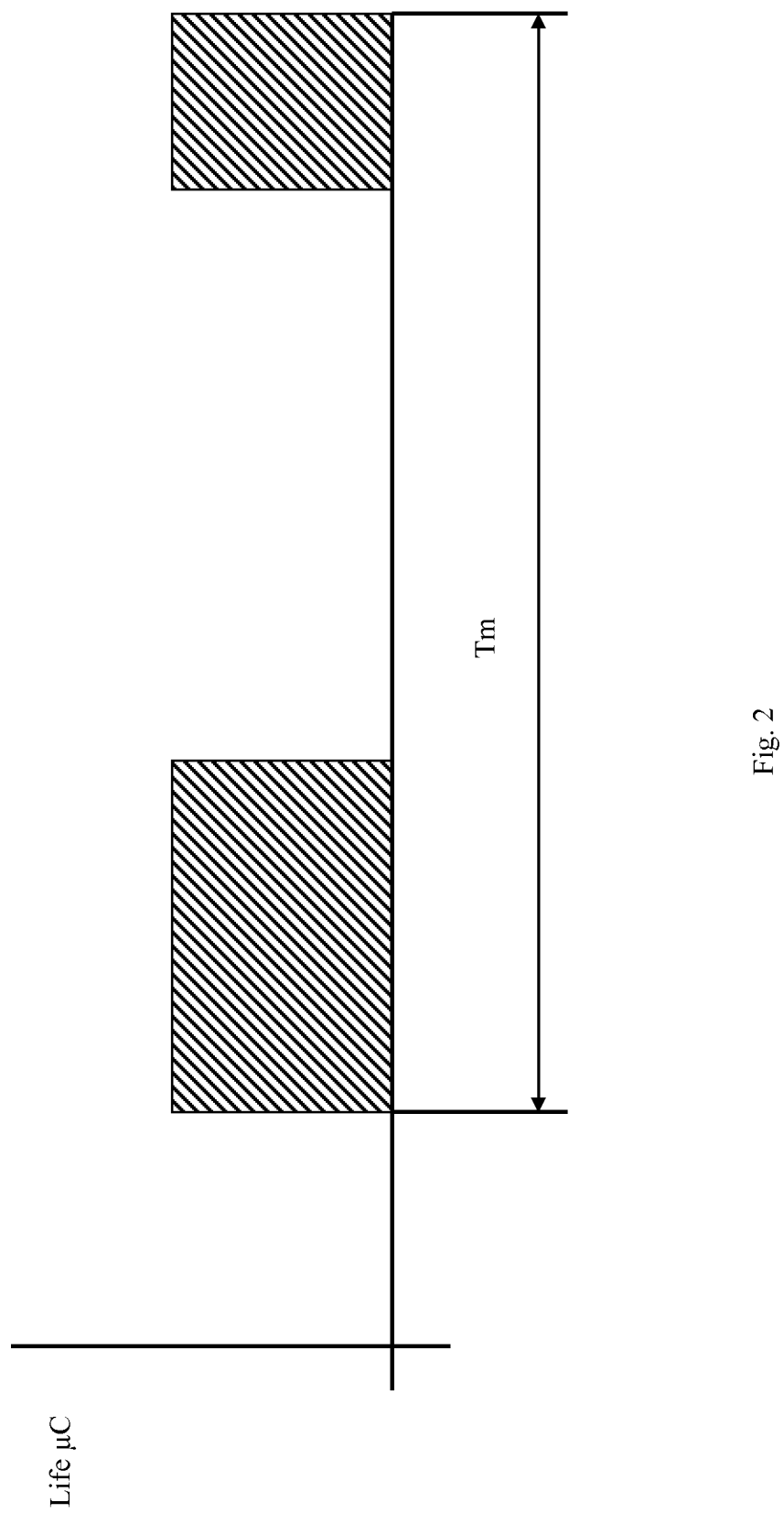
FIG. 2 shows the curve over time of a monitoring signal supplied by the first control unit shown in FIG. 1.

In the case where sensor 20 is an active sensor, which can generate an output signal independently, an input stage 60 is provided, which has a modulator 62 that is constructed in the present case as an AND gate. First, the output signal of sensor 20 is applied to AND gate 62. Also provided is a first, microprocessor-controlled control unit 70 that can have a monitoring signal generation unit 71, a microprocessor 72, at least one memory 74 and a switch 76. Microprocessor 72 is connected to monitoring signal generation unit 71, switch 76 and memory 74. Monitoring signal generation unit 71 generates a monitoring signal, which has the shape shown in FIG. 2 for proper operation of the microprocessor. Microprocessor 72 performs predefined diagnostic and/or monitoring functions, for example, which lead to the alternating current signal shown in FIG. 2 when properly conducted. For example, a high level is generated as soon as microprocessor 72 performs the safety-relevant monitoring routine, with the high-level being generated as long as the monitoring routine is being executed. During the monitoring routine, microprocessor 72 can query predefined interfaces, the contents of memory 74 and other control points, depending upon the implementation. If a started safety-relevant routine has not terminated, then the monitoring signal remains in a static state, which represents a direct current signal. In a similar manner, monitoring signal generation unit 71 generates a static low-level as long as the monitoring routine is not started at all.

In memory 74, there are for example, instructions for microprocessor 72 for performing the diagnosis and safety-relevant monitoring routines. The output signal of monitoring signal generation unit 71, which is preferably a digital signal, is applied to a second input of AND gate 62 of input stage 62 [sic; 60].

In addition to microprocessor-controlled control unit 70, safety device 10 has a second control unit 80 constructed purely on a hardware basis, which has a monoflop 82 [sic; 85] as a hardware realization in the present example. The output signal modulated by AND gate 62 is supplied as an input signal to microprocessor 72 of first control unit 70 and to the trigger input of monoflop 85 of second control unit 80. To turn safety-related unit 30 on or off, safety device 10 has a drivable switching unit 90, also called an output stage. Output stage 90 has a first safety relay 100, which can be driven by switch 76 of first control unit 70. First control unit 70 and safety relay 100 together form channel 1 of the multichannel control device 10. Safety relay 100 has positively driven contacts 101 and 102, of which contact 101 functions as a break contact and contact 102 as a make contact. Positively driven contacts are understood to mean contacts that can never have the same state. If contact 101 is closed, then contact 102 is forcibly opened and vice versa. Contacts 101 and 102 of safety relay 100 represented symbolically in FIG. 1 can be driven via switch 76 of the first control unit, with switch 76 lying in the drive circuit of safety relay 100, while make contact 102 lies in the load circuit of safety relay 100. An energy supply source 50 labeled $V_{cc}$, which provides a voltage of 25 V for example, is connected to break contact 101. Energy supply source 50 can be connected via break contact 101 to a master reset input of monoflop 85.

Second control unit 80 is likewise associated with a safety relay 110, which is arranged in output stage 90. Second safety relay 110 likewise has positively driven contacts. The positively driven contacts have a break contact 111 as well as a make contact 112, which is connected to safety-related unit 30. Make contact 102 of safety relay 100 and make contact 112 of safety relay 110 are connected in series, so that control unit 30 can be put into operation only if both make contacts are closed, i.e., if both first control unit 70 and second control unit 80 drive make contacts 102 and 112 into the closed state. In a manner similar to control unit 70, control unit 80 has a switch 86 that lies in the drive circuit of safety relay 110. Switch 86 receives a control signal from monoflop 85, specifically via its Q-output. Make contact 112 lies in the load circuit of safety relay 110. Break contact 111 is connected to energy supply source 50 and to microprocessor 72 of first control unit 70. In this manner, microprocessor 72 can monitor the functioning of safety relay 110. If, for example, energy supply source 50 is not even connected to microprocessor 71 during a change of state of safety relay 110, then a fault of safety relay 110 is assumed. Second control unit 80 and safety relay 110 form channel 2 of safety device 10.

Supply source 50 can ensure the necessary energy supply to control units 70 and 80.

The functioning of the safety device 10 shown in FIG. 1 will be explained in detail below.

Let it be assumed that safety-related unit 30 is to be put into operation. Consequently a high-level is applied to AND gate 62 via sensor 20. Let it be further assumed that microprocessor 72 is operating properly, so that monitoring signal generation unit 71 generates the alternating current signal shown in FIG. 2 and applies it to the second input of AND gate 62. At the output of AND gate 62, the dynamic monitoring signal appears, which is supplied both to microprocessor 72 and to the trigger input of monoflop 85. If safety relay 100 is operating properly, energy supply source 50 is applied via break contact 101 to the master reset input MR of monoflop 85, as is illustrated in detail in FIG. 5. Since the modulated input signal coming from AND gate 62 is an alternating current signal, monoflop 85 triggers switch 86, which then closes make contact 112 of safety relay 110 and opens break contact 111. Since microprocessor 72 also interprets the received modulated input signal as fault-free, the microprocessor causes switch 76 to close the make contact 102 of safety relay 100 and open break contact 101. Since both make contacts 102 and 112 are closed, industrial robot 40 is connected to operating voltage V. Break contact 101 of safety relay 100 is opened, so that a voltage is no longer present at the MR input of monoflop 85. Since monoflop 85 only triggers make contact 111 if the enable signal is present at the MR input, a latching circuit is provided, which is explained further in FIG. 5. The latching circuit has a switch 87, which is realized as an npn transistor, for example. The collector of switch 87 is connected to ground via a resistor 88. The operating voltage $V_{cc}$ is applied to the emitter input. The base of transistor 87 is connected via a resistor 86 to the Q-output of monoflop 85. A logic LOW level at the Q-output that is present during the operation of the monoflop assures that the operating voltage $V_{cc}$ is fed back to the MR input of monoflop 85, so that the operating voltage is present at the MR input even if break contact 101 of safety relay 100 is open.

Now an emergency will be assumed, in which sensor 20 signals an undesired opening of a safety door, for instance. This has the result that a logic LOW level is generated at the output of sensor 20, which puts the output of AND gate 62 likewise at the logic LOW level. Monoflop 85 then generates a low-level at the Q-output, which drives switch 86 in such a manner that make contact 112 is opened, whereupon safety-related unit 30 is turned off. Microprocessor 72 likewise recognizes, based on the modulated input signal, that sensor 20 has signaled an emergency and drives make contact 102 into the open state via switch 76. In the present example, safety-related unit 30 is shut off by both control units 70 and 80.

For the case where safety relay 100 is functioning properly, the positively driven break contact 101 is closed and the operating voltage 50 is applied to the master reset input of monoflop 85. When sensor 20 again generates a high level, the industrial robot can again be connected to the supply voltage V, as already described. If, however, safety relay 100 is faulty, i.e., make contact 102 no longer opens, break contact 101 remains in the opened state and no enable signal is applied to monoflop 85. Consequently the safety-related unit 30 can no longer be turned on once it has been turned off. In this case, monoflop 85 keeps make contact 112 of safety relay 110 in the opened state. In other words, control unit 80 drives make contact 112 into the closed state only, if firstly, microprocessor 72 of the first control unit is operating faultlessly, and thus monitoring signal generation unit 71 is generating an alternating current signal, and secondly, safety relay 100 is functioning properly, so that the enable signal is applied via break contact 101 to monoflop 85.

Figure 5:
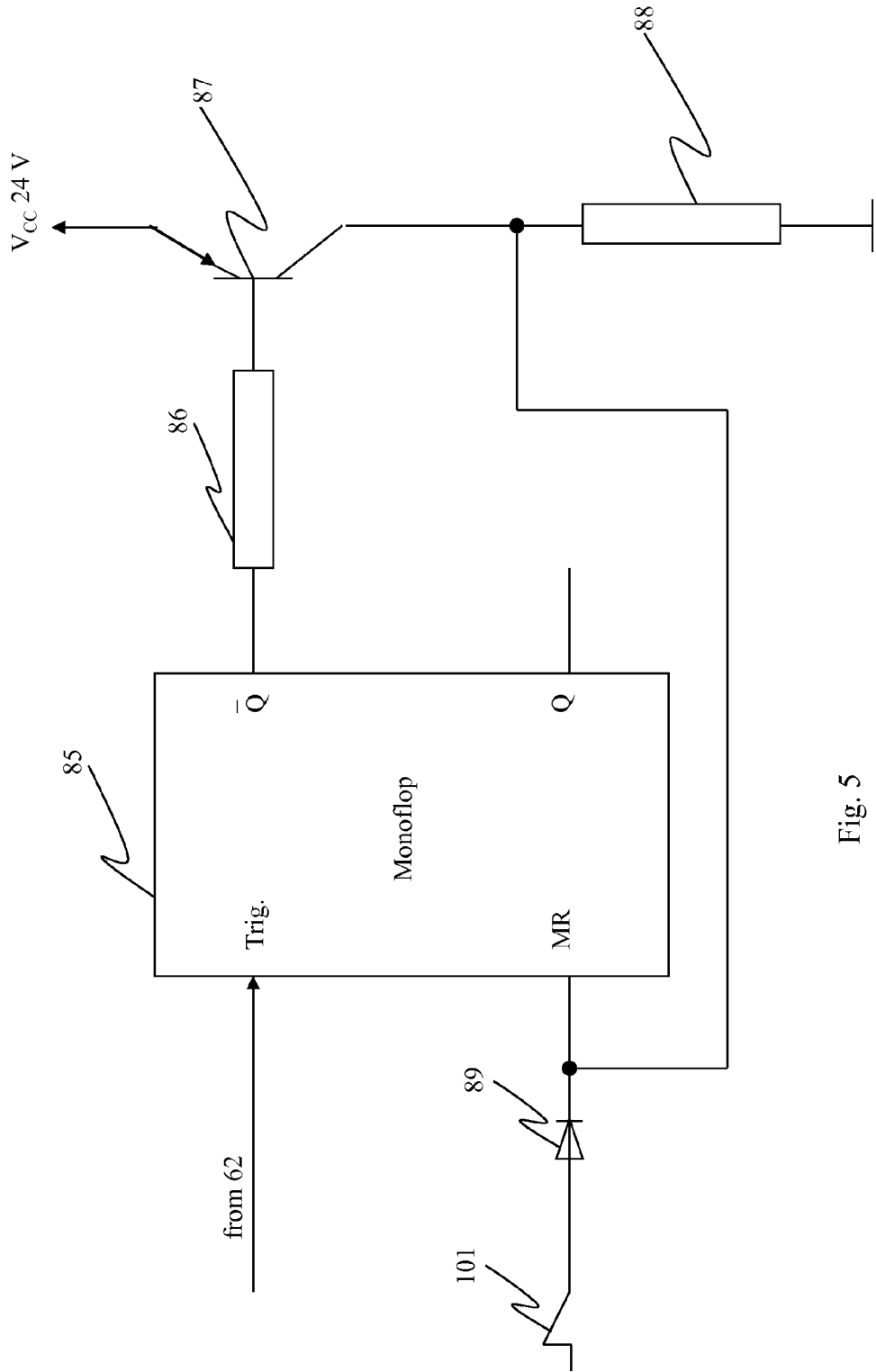
FIG. 5 shows an enable signal holding circuit for the monoflop shown in FIGS. 1 and 3.

It is important to note as well that monoflop 85 shown in FIG. 5 is itself reset after shutting off industrial robot 40. If an alternating current signal is again applied a short time later to the trigger input of monoflop 85, monoflop 85 can only trigger safety relay 110 if the enable signal is also present via break contact 101 at the MR input.

Figure 6:
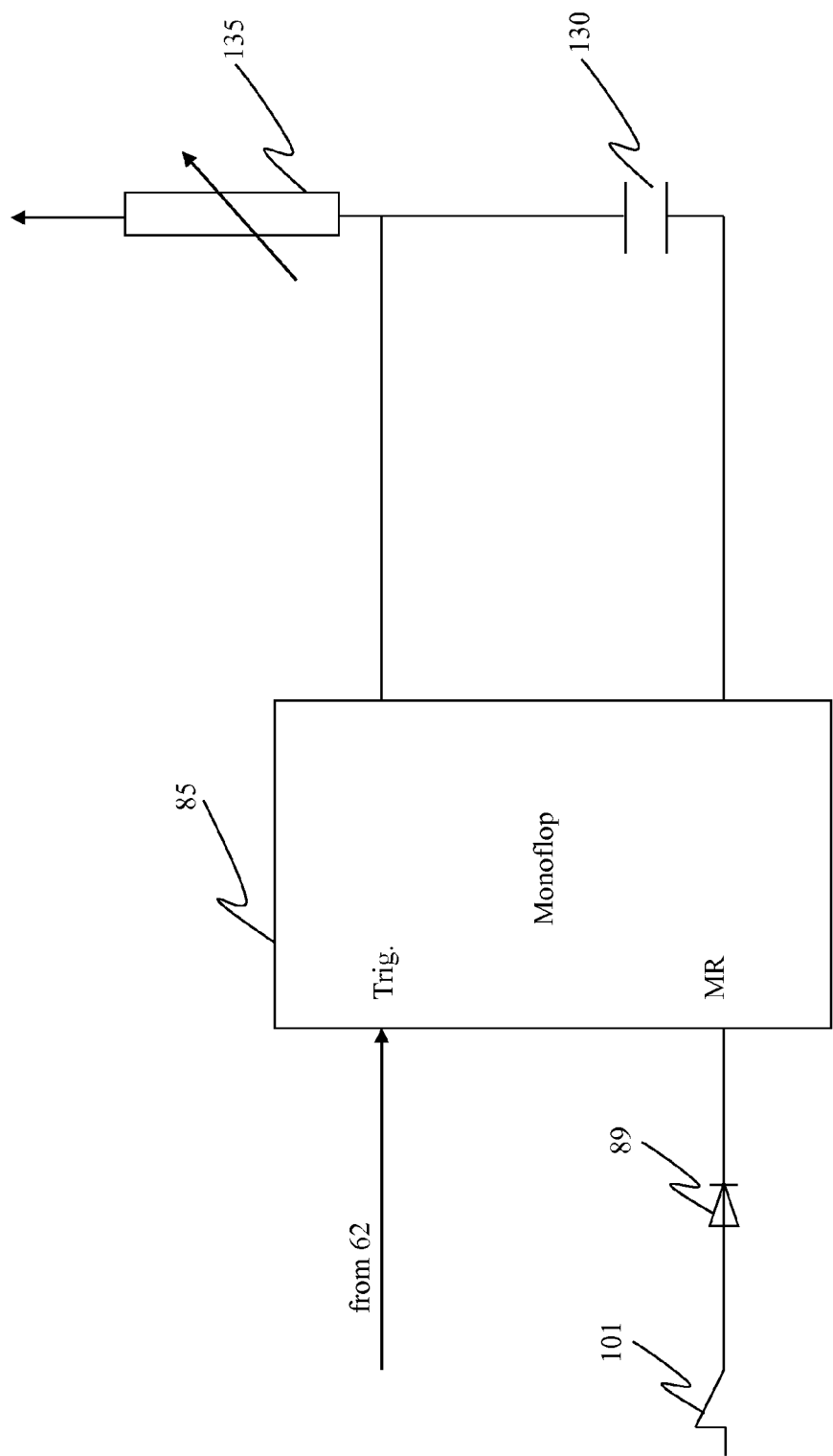
FIG. 6 shows a circuit arrangement for adjusting the reaction time of the monoflop shown in FIGS. 1 and 3.

Already at this point it may be mentioned, that monoflop 85 has an adjustable reaction time. For this purpose, for example, an RC element, which can consist of a potentiometer 135 and a capacitor, is connected to monoflop 85. This circuit is shown in FIG. 6. The reaction time of monoflop 85 can be adjusted by means of potentiometer 135. The reaction time is stored, for example, in memory 74 of control unit 70.

The output of control unit 80 is connected via a line 105 to microprocessor 72. Microprocessor 72 can monitor the operating behavior of control unit 80 by calculating, from the received modulated input signal of AND gate 62 and the transfer function of monoflop 85, its output signal. The transfer function is stored in memory 74, for example. If the fed-back output signal of monoflop 85 agrees with the calculated output, then control unit 80 is operating properly. Otherwise there is a fault. If microprocessor 72 recognizes such a fault, it can open make contact 102 of safety relay 100 via switch 76, so that safety-related unit 30 is shut off Alternatively or optionally, microprocessor 72 can also drive switch 86 to open make contact 112 of safety relay 110.

Figure 3:
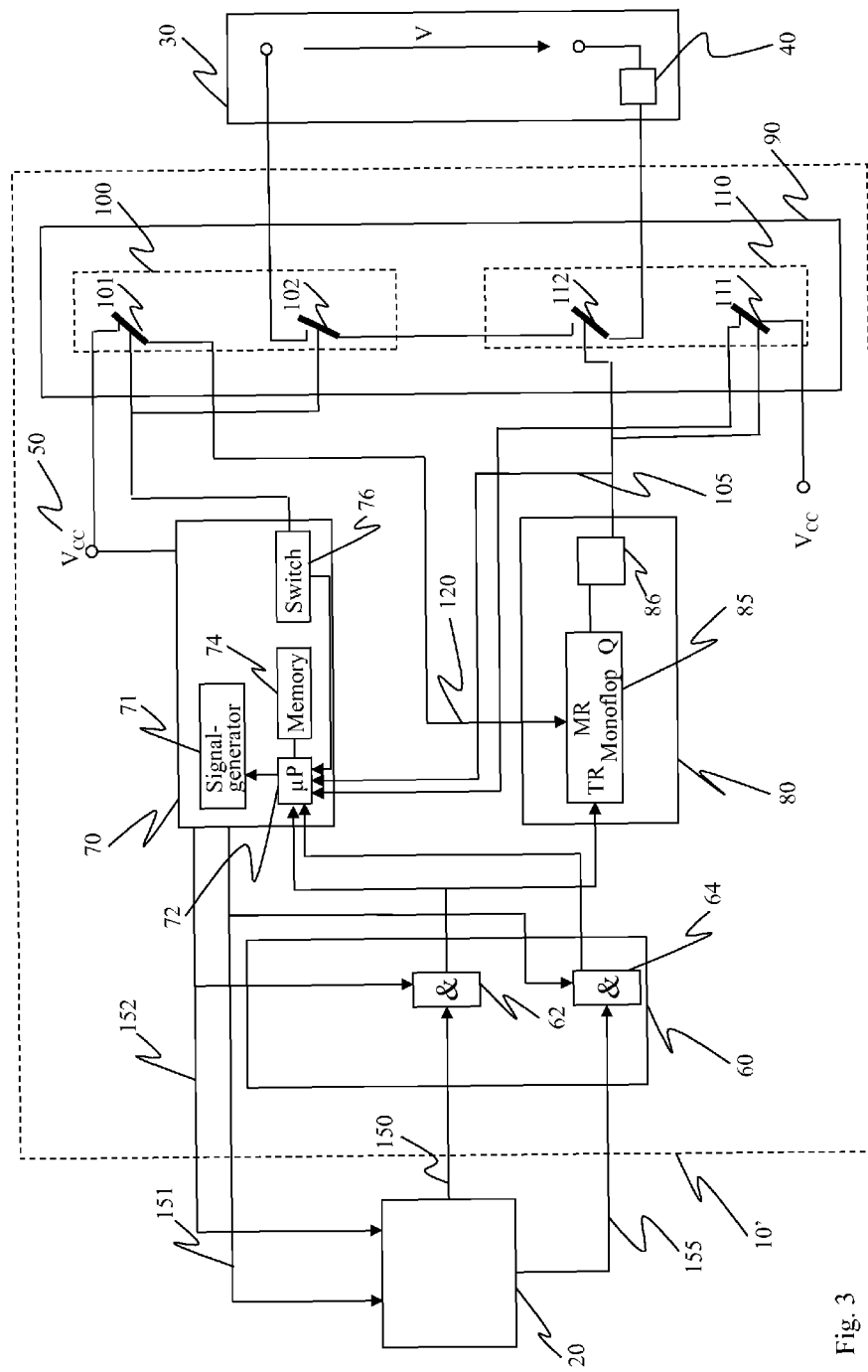
FIG. 3 shows a schematic block circuit diagram of an alternative safety device in which, unlike the safety device shown in FIG. 1, two monitoring signals are generated by the first control unit.
Figure 4:
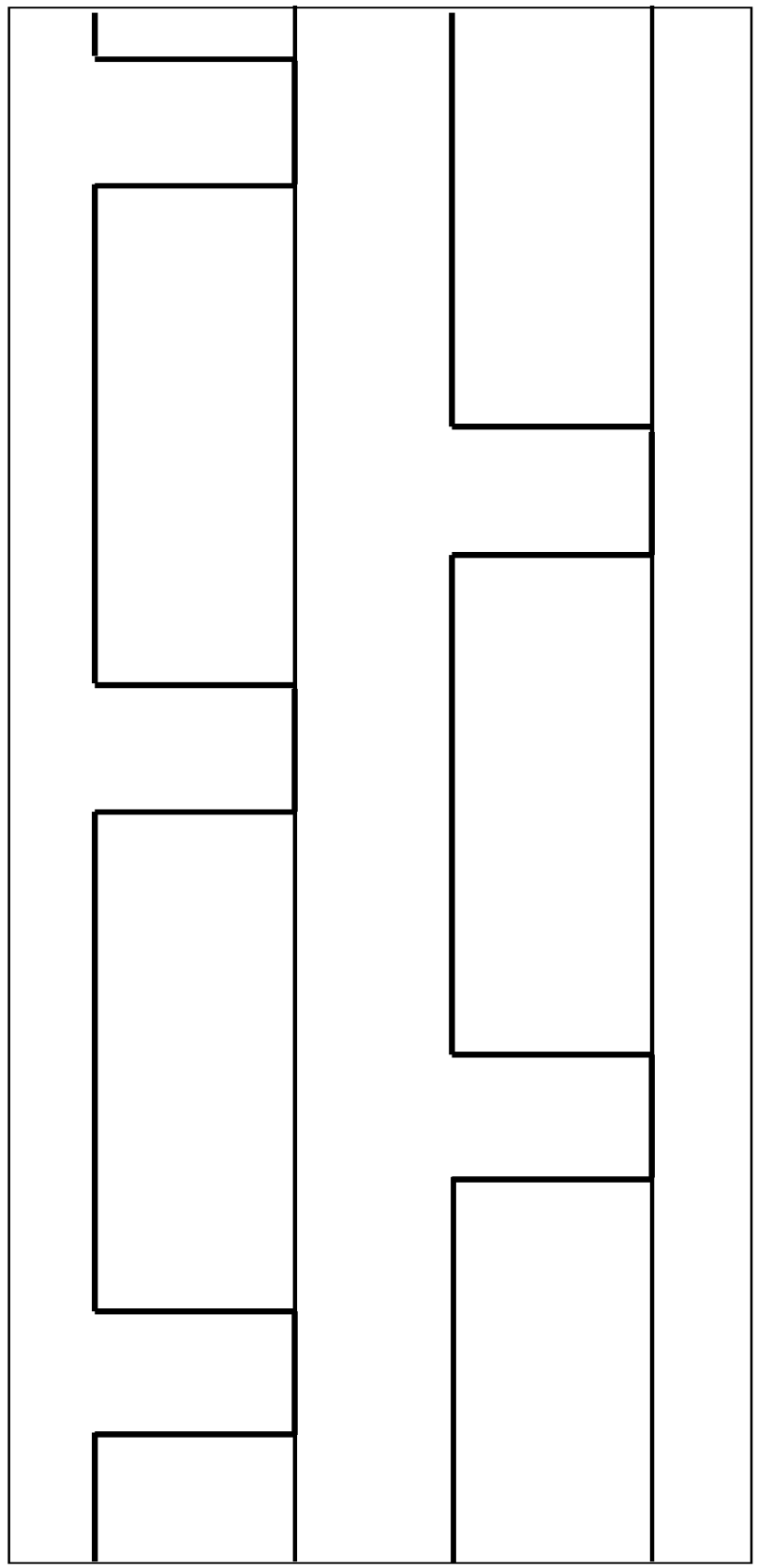
FIG. 4 shows the time-offset monitoring signals supplied by the first control unit shown in FIG. 3.

FIG. 3 shows an additional multichannel safety device 10', which differs from safety device 10 shown in FIG. 1 in that monitoring signal generation unit 71 of first control unit 70 supplies two monitoring signals, and a passive sensor 20 such as an emergency off button is connected via digital terminals (not shown) to safety device 10'. If microprocessor 72 is executing its specified functions properly, monitoring signal generation unit 71 generates the alternating current signals shown in FIG. 4, which are merely phase-shifted with respect to one another. In this manner, passive sensor 20 connected to safety device 10' can be queried in two channels in order to be able to recognize short circuits and cross-connections in input lines 151 and 152 and in its output lines 150 and 155. In addition to AND gate 62, input stage 60 has another AND gate 64. The first monitoring signal is applied by monitoring generation unit 71 internally to an input of AND gate 62 and is fed via one of the digital outputs and input line 152 to one input of sensor 20. The first monitoring signal is additionally fed via an internal switch 21 of sensor 20 and output line 150 to an additional input of AND gate 62. In a similar manner, the second monitoring signal is applied by monitoring signal generation unit 71 internally to an input of AND gate 64 and is fed via the other digital output and input line 151 to another input of sensor 20. The second monitoring signal is additionally fed via an internal switch 22 of sensor 20 and output line 155 of sensor 20 to an additional input of AND gate 64. Only the output signal of AND gate 64 is fed to microprocessor 72, whereas the output of AND gate 62 is connected both to microprocessor 72 and to the trigger of monoflop 85 of the second control unit.

The functioning of safety device 10' shown in FIG. 3 essentially corresponds to that of safety device 10 shown in FIG. 1, but additionally, as already mentioned, cross-connections between output lines 150 and 155, and input lines 151 and 152, as well as short circuits of output lines 150 and 155 and/or input lines 151 and 152, can be recognized. If for example, a short circuit occurs between output line 155 and ground, or input line 151 and ground, then a low level is applied to the corresponding input of AND gate 64, which causes the output of AND gate 64 also to be at the low level. This state is signaled to microprocessor 72, which recognizes a fault from the reported state. Thereupon the microprocessor drives switch 76 in the drive circuit of safety relay 100 in such a manner that make contact 102 is opened and thus safety-related unit 30 can be turned off.

In a similar manner, the input of AND gate 62 connected to connection line 150 is set to LOW, when a short circuit of line 150 or 152 to ground has occurred. A logic zero at the input of AND gate 62 insures that the output also lies at logic zero, so that monoflop 85 likewise supplies a logic zero at the output. In response to the output signal of monoflop 85, switch 86 is triggered in such a manner that make contact 112 is opened, and thus safety-related unit 30 is turned off. Furthermore, in response to logic zero at the output of AND gate 62, microprocessor 72 drives switch 76 in such a manner that make contact 102 is opened and thus safety-related unit 30 is turned off.

If a cross-connection between input lines 151 and 152 or between output lines 150 and 155 occurs, then static signals with identical potential are applied to the inputs of AND gates 62 and 64. Consequently the static signal present at the output of AND gate 62 causes monoflop 85 to drive switch 86 in such a manner that make contact 112 is opened and thus safety-related unit 30 is turned off. Furthermore, the static signal present at the output of AND gates 62 and/or 64 causes microprocessor 72 to drive switch 76 in such a manner that make contact 102 is opened and thus safety-related unit 30 is turned off.

Now a case will be considered where output line 150 and/or input line 152 are short-circuited to the operating voltage. In this case, there are again two static signals of equal potential at AND gate 62, which causes the static output signal of AND gate 62 to drive monoflop 85 and thus switch 86 in such a manner that make contact 112 is opened and thus safety-related unit 30 is shut off. Furthermore, the static signal present at the output of AND gate 62 can cause microprocessor 72 to drive switch 76 in such a manner that make contact 102 is opened and thus safety-related unit 30 is turned off.

Now a case will be considered where output line 155 and/or input line 151 are short-circuited to the operating voltage. In this case, there are again two static signals of equal potential at AND gate 64. In response to the static output signal of AND gate 62, microprocessor 72 drives switch 76 in such a manner that make contact 102 is opened and thus safety-related unit 30 is turned off.

For the case in which sensor 20 is an active sensor, the two connection lines 151 and 152 are absent, so that the two monitoring signals generated by monitoring signal generation unit 71 are not fed to sensor 20.

Thanks to the safety device, it is now possible for the second, hardware-based control unit 80 to check the proper functioning of safety relay 100 associated with first control unit 70, and in case a fault appears, to ensure that safety-related unit 30 is shut off. It is thereby assured that second control unit 80 goes into operation only if the enable signal of channel 1 is present at the MR input.

What is claimed is:

1. A safety device for multichannel controlling of a safety-related unit, comprising:
   a first control unit controlled by a microprocessor and having a signal generation unit for generating a first monitoring signal that indicates the current operating state of the first control unit;
   a second control unit;
   a switching unit drivable by the first and second control units that can turn on the safety-related unit or run it into a secured state, wherein the second control unit has a hardware-based switching unit that, in response to the monitoring signal, drives the switching unit in such a manner that the safety-related unit is drivable into a safe state in case of faulty operation of the first control unit,
   wherein the switching unit comprises a first safety relay connected to the first control unit and a second safety relay connected to the second control unit, wherein each safety relay comprises at least one normally open contact and one normally closed contact fixedly coupled to one another; and
   a device connected to the first safety relay and configured to apply an enable signal to the second control unit via the first safety relay only in case of a fault-free function of the first safety relay.

2. The safety device according to claim 1, wherein the signal generation unit generates an alternating current signal when the first control unit operates fault-free, and a direct current signal when the first control unit is operating in a faulty manner.

3. The safety device according to claim 2, wherein the hardware-based switching unit comprises a monoflop.

4. The safety device according to claim 3, wherein the monoflop has a master reset input connectable via the first safety relay to the device and a trigger input.

5. The safety device according to claim 4, further comprising a circuit connected to the monoflop, wherein the circuit is configured to hold the master reset input at the level of the enable signal, wherein the monoflop is reset when no signal or a static signal is present at the trigger input.

6. The safety device according to claim 3, further comprising a unit configured to adjust the reaction time of the monoflop, wherein the first control unit comprises a memory for storing the current reaction time of the monoflop and wherein the microprocessor is constructed to monitor the reaction time of the monoflop.

7. The safety device according to claim 1, further comprising
an input stage (60) connected to the first, microprocessor-controlled unit (70) and the second control unit (80), wherein the input stage is constructed to modulate an input signal coming from an externally connectable sensor unit (20) with the first monitoring signal generated by the signal generation unit (71), wherein, in response to the modulated input signal, the first, microprocessor-controlled control unit (70) and/or the second control unit (80) can drive the safety-related unit (40) into a safe state, wherein the first modulated input signal is applied to a trigger input of the hardware-based switching unit (80, 85).

8. The safety device according to claim 7, wherein
the signal generation unit (71) supplies a second monitoring signal, and wherein
the input stage (60) is constructed to modulate a second input signal coming from the externally connectable sensor unit (20) with the second monitoring signal generated by the signal generation unit (71), wherein the second modulated input signal is supplied for evaluation only to the first control unit (70).

9. The safety device according to claim 8, wherein the input stage (60) has a first logic unit (62) for performing an AND-operation on the first input signal and the first monitoring signal and a second logic unit (64) for performing an AND-operation on the second input signal and the second monitoring signal.

10. The safety device according to claim 1, wherein
the signal generation unit (71) supplies a second monitoring signal,
the first monitoring signal is conducted via an externally connected passive sensor to the first and the second control unit (70, 80) and
the second monitoring signal is conducted via the externally connected sensor unit (20) to the first control unit (70).

11. The safety device according to claim 1, wherein
the first control unit has a memory in which the transfer function of the hardware-based switching unit is stored, and wherein
the microprocessor of the first control unit determines the operating state of the second control unit using the first modulated input signal, an output signal of the second control unit and the transfer function.

* * * * *

UNITED STATES PATENT AND TRADEMARK OFFICE
CERTIFICATE OF CORRECTION

PATENT NO. : 8,692,420 B2  
APPLICATION NO. : 12/668086  
DATED : April 8, 2014  
INVENTOR(S) : Henning Frevert It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1124 days.

Signed and Sealed this

Twenty-ninth Day of September, 2015

Michelle K. Lee  
*Director of the United States Patent and Trademark Office*